United States Patent
Wang

(10) Patent No.: US 6,875,158 B2
(45) Date of Patent: Apr. 5, 2005

(54) TWIST VEHICLE WITH STEERING WHEEL SHAFT SUPPORT ARRANGEMENT

(76) Inventor: Jar Chen Wang, 16320 Bloomfield Ave., Cerritos, CA (US) 90703

( * ) Notice: Subject to any disclaimer, the term of this patent is extended or adjusted under 35 U.S.C. 154(b) by 84 days.

(21) Appl. No.: 10/298,101

(22) Filed: Nov. 18, 2002

(65) Prior Publication Data

US 2004/0097334 A1 May 20, 2004

(51) Int. Cl.[7] .............................................. A63B 22/00
(52) U.S. Cl. ..................................... 482/51; 280/87.021
(58) Field of Search .......................... 482/51; D21/419, D21/424–426, 435; 180/210, 211; 280/218, 246, 1.181, 1.188, 1.23, 270, 87.021, 87.01, 263, 267, 827, 828

(56) References Cited

U.S. PATENT DOCUMENTS

| | | | | |
|---|---|---|---|---|
| 52,209 A | * | 1/1866 | Dawson | 166/67 |
| 3,492,017 A | * | 1/1970 | Czichos | 280/87.021 |
| 3,863,950 A | * | 2/1975 | Jordan | 280/218 |
| 4,714,261 A | * | 12/1987 | Kassai | 280/7.1 |
| 6,386,304 B1 | * | 5/2002 | Wang | 180/65.1 |
| 6,431,566 B1 | * | 8/2002 | Gu | 280/87.021 |
| 6,499,755 B2 | * | 12/2002 | Gu | 280/210 |
| 6,619,677 B2 | * | 9/2003 | Wei | 280/87.021 |
| 6,634,662 B1 | * | 10/2003 | Gu | 280/218 |
| 6,641,149 B2 | * | 11/2003 | Chiappetta et al. | 280/87.01 |

* cited by examiner

Primary Examiner—Stephen R. Crow
Assistant Examiner—Tam Nguyen
(74) Attorney, Agent, or Firm—Raymond Y. Chan; David and Raymond

(57) ABSTRACT

A twist vehicle includes a vehicle frame, a connecting member rotatably mounted thereon, and a steering wheel shaft support arrangement, wherein the steering wheel shaft support arrangement includes a steering wheel shaft supporting frame, having a guiding slot formed thereon, detachably mounting the steering wheel shaft supporting frame on the vehicle frame, in such a manner that when the steering wheel shaft supporting frame is mounted on the vehicle frame, an upper control portion of the connecting member is slidably passed through the guiding slot, so as to substantially support the connecting member with respect to the vehicle frame.

8 Claims, 9 Drawing Sheets

TWIST VEHICLE WITH STEERING WHEEL SHAFT SUPPORT ARRANGEMENT

BACKGROUND OF THE PRESENT INVENTION

1. Field of Invention

The present invention relates to vehicle, and more particularly to a twist vehicle incorporated with steering wheel shaft support arrangement which enables the wheel shaft to be detachably mounted on the twist vehicle so as to provide such desirable advantages as easy transportation and convenient storage.

2. Description of Related Arts

Conventional twist vehicles have provided people, and especially children, an opportunity to entertain and do reasonable amount of exercise at the same time. They are becoming more and more popular in the marketplace.

Referring to FIG. 1 of the drawings, a conventional twist vehicle 10B usually comprises a vehicle frame 20B, a rear wheel assembly 30B rotatably mounted on a rear portion of the vehicle frame 20B, a twisting unit 40B rotatably mounted on the vehicle frame 20B for driving the twist vehicle 10B, wherein the twisting unit 40B comprises a triangular twisting member 41B, a pair of driving wheels 42B rotatably and spacedly mounted on two corner portions of the twisting member 41B respectively, a steering member 43B rotatably provided on the vehicle frame 20B for driving and controlling the twist vehicle to move in a particular desirable direction, and a connecting member 44B which has a controlling end 441B connected to the steering member 43B, and a twisting end 442B connected to the remaining corner portion of the twisting member 41B. Whereby, when twisting motions—subsequent clockwise and anti-clockwise movement are imparted to the steering member such as that imparted by a rider of the twist vehicle 10B, the twisting motions will be transmitted to the twisting member 41B via the connecting member 44B, and as a result, the twisting member 41B rotates accordingly about the connecting member 44B. The driving wheels 42B then drive the twist vehicle 10B to move.

Almost all conventional twist vehicles 10B have their twisting unit 40B rotatably mounted on a front portion of the vehicle frame 20B. In order to enhance the stability and rigidity of the twist vehicle 10B, and especially its twisting unit 40B, the vehicle frame 20B usually further has a front wheel shaft support portion 21B provided thereon, wherein the wheel shaft support portion 21B is usually upwardly extending. As a consequence, the front portion of the vehicle frame 20B is usually bulgy with respect to the remaining portions of the vehicle frame 20B. As a matter of fact, the bulgy wheel shaft support portion 21B of the vehicle frame 20B not only gives better support to the twisting unit 40B, and with deliberated ornamental design, it also gives better appearance to the twist vehicle.

On the other hand, in order to make the rider of the twist vehicle 10B comfortable, the steering member 43B is usually provided at a highest position with respect to the remaining parts of the twist vehicle 10B in order to suit the position of the rider's wrists.

All these contribute to significant disadvantages from the viewpoints of effective manufacturing management as well as marketing management. First, a bulgy front wheel shaft support portion of the vehicle frame 20B means significant space occupation during storage and transportation. As a result, unnecessary storage and transportation costs are induced. Second, it is generally technically easier to mold a small article of manufacture than a large article of manufacture for the same quality. That is to say, it is easier, and may be cheaper for mass production, to mold the wheel shaft support potion 21B and the remaining portion of the vehicle frame 20B separately than molding the vehicle frame 20B (including the wheel shaft support portion) as a whole.

Even through the vehicle frame 20B is manufactured in accordance with the above-mentioned manner, the way as how to connect the wheel shaft support portion 21B and the remaining portion of the vehicle frame 20B possesses a pressing problems. Since the twisting unit 40B in which wheel shaft support portion 21B supports is subjected to frequent twisting, poor connection between the wheel shaft support portion 21B and the remaining portion of the vehicle frame 20B may lead to catastrophic consequences.

SUMMARY OF THE PRESENT INVENTION

A main object of the present invention is to provide a twist vehicle which comprises a vehicle frame, a twisting unit, and a steering wheel shaft support arrangement, wherein the wheel shaft support arrangement is detachably mounted on the vehicle frame for providing a substantial support to the twisting unit.

Another object of the present invention is to provide a twist vehicle with steering wheel shaft support arrangement, wherein the twisting unit can be detachably mounted to the wheel shaft support arrangement, so that the twist vehicle can be decomposed into several parts for easy storage and transportation.

Another object of the present invention is to provide a twist vehicle with steering wheel shaft support arrangement, wherein the connection between the wheel shaft support arrangement and the vehicle frame is strong enough for withstanding frequent twisting from the twisting unit.

Another object of the present invention is to provide a twist vehicle with steering wheel shaft support arrangement, wherein the steering wheel shaft support arrangement does not alter the original structure of the twist vehicle, so as to minimize the manufacturing of the twist vehicle.

Accordingly, in order to accomplish the above objects, the present invention provides a twist vehicle comprising:

a vehicle frame;

a rear wheel assembly rotatably mounted underneath a rear portion of the vehicle frame;

a twisting unit, which comprises:

a connecting member rotatably supported by the vehicle frame, wherein the connecting member has an upper control portion extended above the vehicle frame, and a lower driving portion downwardly extended from the upper driving portion and arranged in such a manner that when a rotational motion is imparted to the upper control portion, the lower driving portion rotates accordingly;

a steering member detachably mounted on the upper control portion of said connecting member;

a twisting member having a front portion mounted on the lower driving portion of the connecting member; and a driving wheel assembly mounted on a rear portion of the twisting member, wherein when subsequent clockwise and anti-clockwise movements are imparted to the steering member, the twisting member rotates accordingly about the connecting member so as to drive the twist vehicle to move; and a wheel shaft support arrangement which comprises:

a steering wheel shaft supporting frame, having a guiding slot formed thereon and positioned above the vehicle frame, detachably mounted on the vehicle frame in such a manner that when the connecting member is upwardly extended from the vehicle frame, the upper control portion of the connecting member is arranged to slidably pass through the guiding slot so as to retain the connecting member in position with respect to the vehicle frame.

DETAILED DESCRIPTION OF THE PREFERRED EMBODIMENT

Figure 1:
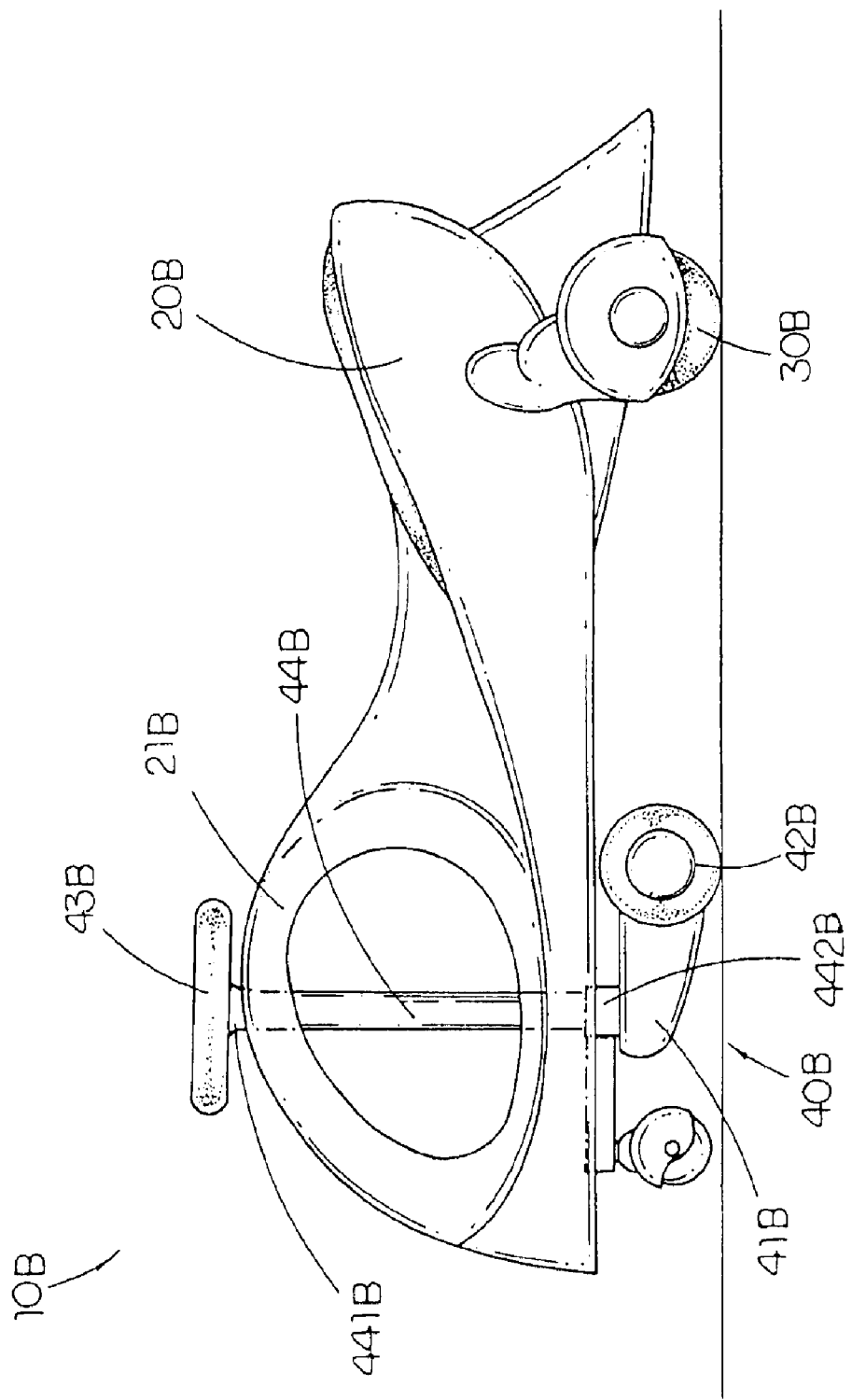
FIG. 1 is a perspective view of a conventional twist vehicle.
Figure 2:
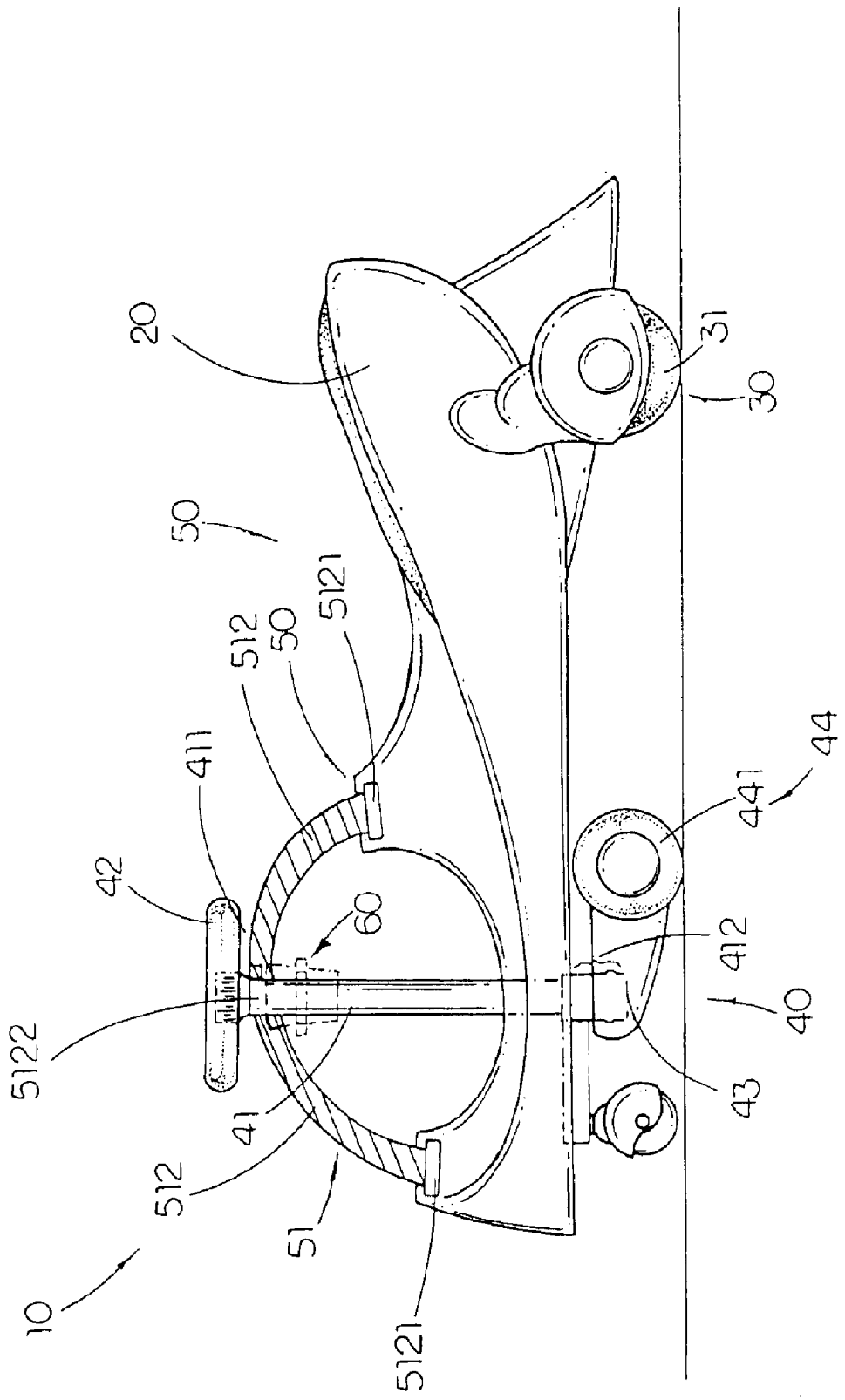
FIG. 2 is a partially sectional side view of a twist vehicle with a wheel shaft support arrangement according to a first preferred embodiment of the present invention.

Referring to FIGS. 2 to 3 of the drawings, a twist vehicle 10 according to a first preferred embodiment of the present invention is illustrated. The twist vehicle 10 comprises a vehicle frame 20, a rear wheel assembly 30, a twisting unit 40, and a steering wheel shaft support arrangement 50, wherein the twisting unit 40 comprises a connecting member 41, a steering member 42, a twisting member 43, and a driving wheel assembly 44.

The connecting member 41 is rotatably mounted on the vehicle frame 20, wherein the connecting member 41 has an upper control portion 411 extended above the vehicle frame 20, and a lower driving portion 412 downwardly extended from the upper control portion 411 and arranged in such a manner that when a rotational motion is imparted to the upper control portion 411, the lower driving portion 412 will rotate accordingly.

The steering member 42 is detachably connected to the upper control portion 411 of the connecting member 41, hence, it is adapted for driving the connecting member 41 to rotate.

The rear wheel assembly 30 comprises a pair of rear wheels 31 rotatably mounted underneath a rear portion of the vehicle frame 20 through a common wheel axis 32.

Hence, it is capable of rotatably supporting the rear portion of the vehicle frame 20 and facilitating a smooth movement of the twist vehicle 10.

The twisting member 43 is preferably triangular in shape having a front corner portion and two rear corner portions, wherein the front corner portion is detachably mounted to the lower driving portion 412 of the connecting member 41. Moreover, the driving wheels assembly 44 comprises a pair of driving wheels 441 rotatably connected to the two rear corner portions of the twisting member 43 through a driving wheels axle. In other words, the driving wheel assembly 44 is mounted to the rear corner portion the twisting member 43 in such a manner that it is spacedly apart from the front corner portion of the twisting member 43.

Thus, when subsequent clockwise and anti-clockwise movements are imparted to the steering member 42, the twisting member 43 will be driven to rotate accordingly about the connecting member 41, causing the twist vehicle 10 to move.

Accordingly, the connecting member 41 is essentially a shaft vertically and rotatably extended through the vehicle frame 20 through a mounting hole 201 provided thereon in such a manner that the rotational movement at the control portion 411 of the connecting member 41 is directly transmitting to the driving portion 412 thereof.

The steering wheel shaft support arrangement 50 comprises a steering wheel shaft support frame 51 which has a guiding slot 511 formed thereon and means 501 for detachably mounting the steering wheel shaft support frame 51 on the vehicle frame 20, wherein when the connecting member 41 is upwardly extended from the vehicle frame 20, the upper control portion 411 of the connecting member 41 is arranged to slidably pass through the guiding slot 511 while the steering member 42 is positioned on top of the steering wheel shaft support frame 51 so as to substantially retain the connecting member 41 in position with respect to the vehicle frame 20. In other words, the steering wheel shaft support frame 51 is adapted for detachably mounting onto the vehicle frame 20 in order to provide detachable support to the connecting member 41.

It is worth mentioning that the guiding slot 511 of the steering wheel shaft support frame 51 is positioned above the vehicle frame 20 and aligned with the mounting hole 201 of the vehicle frame 20 in such a manner that the control portion 411 of the connecting member 41 is substantially supported by the steering wheel shaft support frame 51. Since the steering member 42 is lifted upwardly with respect to the vehicle frame 20 at a predetermined distance, the rider does not have to further bend his or her body forward to reach the steering member 42 for applying the twisting force thereon. Therefore, control portion 411 of the connecting member 41 must be well supported in order to prevent the connecting member 41 from being broken by the twisting force.

The steering wheel shaft support frame 51 comprises at least a shaft supporting arm 512 upwardly extended from the vehicle frame 20 to support the connecting member 41 with respect to the vehicle frame 20. According to the first preferred embodiment of the present invention, the steering wheel shaft support frame 51 comprises two shaft supporting arms 512 each having a connecting end 5121 adapted for detachably mounting on the vehicle frame 20, and a coupling end 5112 upwardly extended from the respective connecting end 5121, wherein the coupling ends 5122 of the two shaft supporting arms 512 are arranged to detachably couple with each other.

The mounting means 501 contains two securing slots 52 provided on the vehicle frame 20 for the connecting ends 5121 of the two supporting arms 512 to be slidably inserted therein respectively, wherein the steering wheel shaft support frame 512 is detachably mounted on the vehicle frame 20 by detachably mounting the two supporting arms 512 in the two securing slots 52 respectively.

The mounting means 501 further comprises a plurality of connectors 54, such as screws or bolts, detachably connected each of the connecting ends of the steering wheel shaft support frame 51 with the vehicle frame 20 to securely mount the steering wheel shaft support frame 51 on the vehicle frame 20. In other words, the mounting, according to the first preferred embodiment, can be accomplished by conventional connectors 54 such as screws, bolts and bolt nuts etc, in order to provide a secure attachment between the steering wheel shaft support frame 51 and the vehicle frame 20.

Figure 3A:
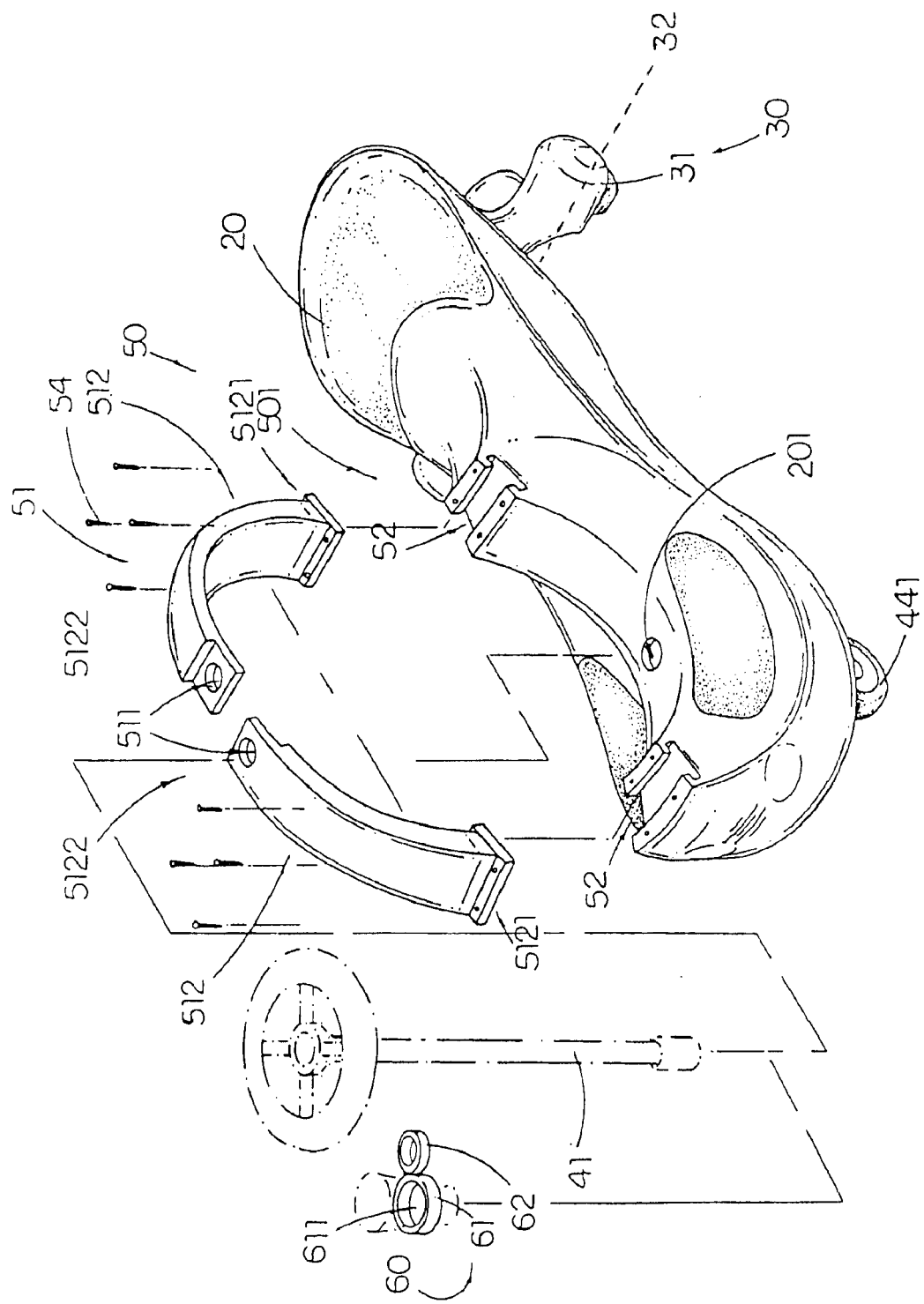
FIG. 3A is an exploded perspective view of a twist vehicle with a wheel shaft support arrangement according to the above first preferred embodiment of the present invention.

As shown in FIG. 3A, a distance between the two securing slots 52 is the same as a distance between the two connecting ends 5121 of the steering wheel shaft support frame51 such that the steering wheel shaft support frame 51 is capable of detachably mounted on the vehicle frame 20 by fittedly inserting the connecting ends 5121 of the steering wheel shaft support frame 51 into the securing slots 52 respectively.

Moreover, each of the securing slots 52, having a U-shaped cross sectional, has two opening provided at two sides thereof, wherein each of the connecting end 5121 of the shaft supporting arm 512 is sidewardly slid to the respective securing slot 52 such that the steering wheel supporting frame 51 is mounted on the vehicle frame 20 in position.

Each of the two shaft supporting arms 512 has a through holding hole formed on its corresponding coupling end 5122 wherein when the two supporting arms 512 are detachably mounted into the two securing slots 52, the two coupling ends 5122 of two supporting arms 512 are arranged to overlappedly coupled with each other to form the guiding slot 511 of the steering wheel shaft support frame 51. It is worth mentioning that the size and shape of the guiding slot 511 should be designed to substantially fit the size and shape of the connecting member 41. In other words, the connecting member 41 can be well supported by the steering wheel shaft support frame 51 by fittedly passing through the guiding slot 511 thereon.

According to the first preferred embodiment of the present invention, the two supporting arms 512 each has an arc-like shape such that when they are mounted on the vehicle frame 20 and coupled with each other, they form a semi-circular steering wheel shaft support frame 51 which is bulge out from the vehicle frame 20 for securely supporting the longitudinally erected connecting member 41.

In order to mount the steering wheel shaft support frame 51 on the vehicle, first, the rider has to slidably insert the connecting ends 5121 of the supporting arms 512 into the securing slots 52 respectively so as to detachably mount the steering wheel shaft support frame 51 on the vehicle frame 20 in position; second, the rider has to couple the two coupling ends 5122 of the supporting arms 512 with each other by simultaneously passing the connecting member 41 through the holding holes of the two supporting arms 512; last, the rider only need to attach the steering member 42 to the upper control portion 411 of the connecting member 41 in order to complete the attachment procedures.

Accordingly, in order to detach the steering wheel shaft support frame 51 from the vehicle frame 20, the rider only needs to do the reverse of the above-mentioned attaching procedures. No complicated mechanical procedures or skill are required to attach and detach the steering wheel shaft support frame onto and from the vehicle frame 20 respectively.

It is worth mentioning that after the steering wheel shaft support frame 51 is attached to the vehicle frame 20, it substantially supports and stabilizes the connecting member 41, and especially its upper control portion 411, when it is being twisted by subsequent clockwise and anti-clockwise movement imparted thereon. When the twist vehicle 10 is not in use or need to be transported for long distance, the rider can detach the steering wheel shaft support frame 51 from the vehicle frame 20 for convenient storage or transportation.

Figure 3B:
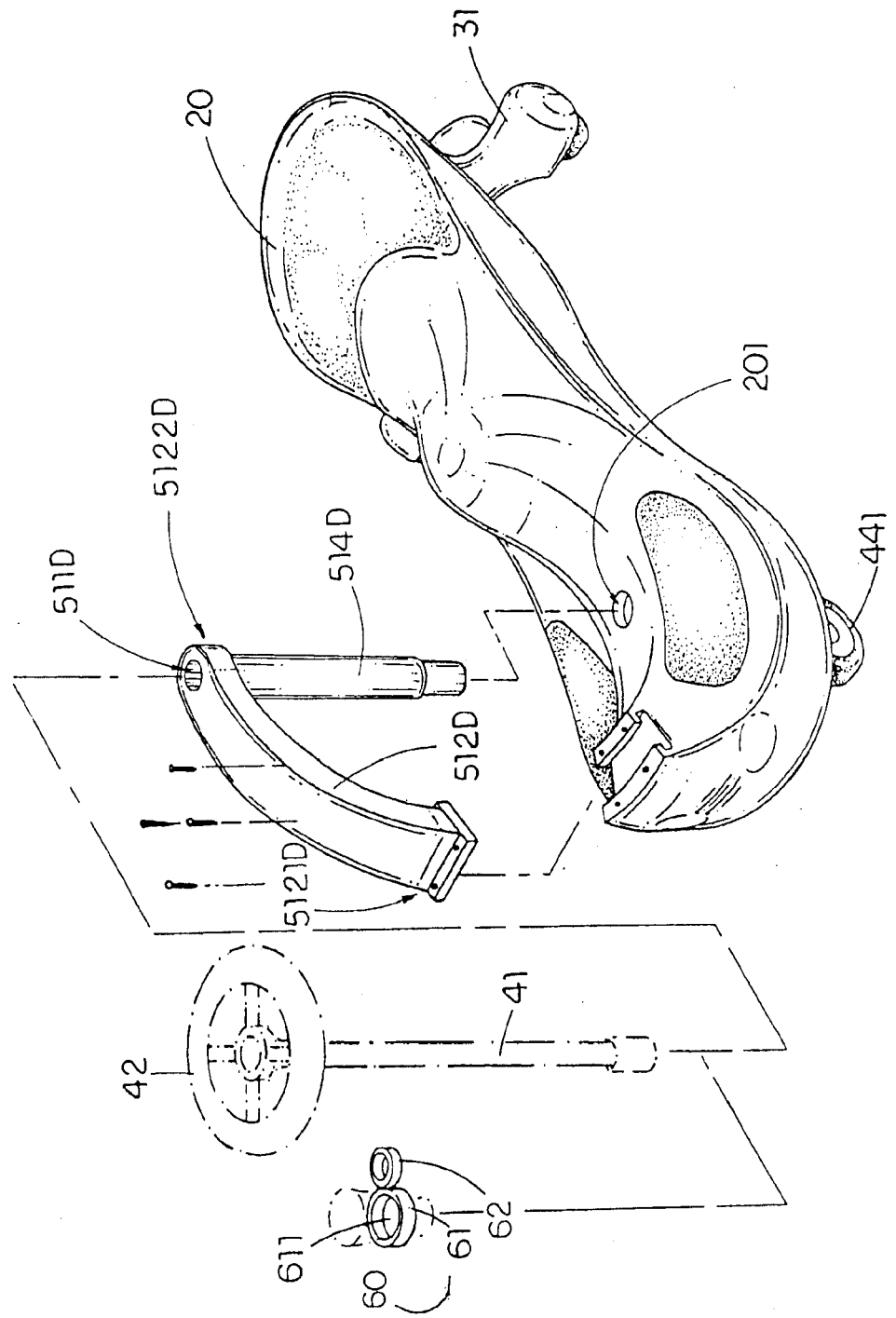
FIG. 3B illustrates an alternative mode of the shaft supporting arm of the wheel shaft support arrangement of the twist vehicle according to the above first preferred embodiment of the present invention.

As shown in FIG. 3B, the first shaft supporting arm 512D has a connecting end 5121D arranged to detachably mount on the vehicle frame and a coupling end 5112D upwardly extended above the vehicle frame 20 while the guiding slot 511D is formed on the coupling end 5112D of the first shaft supporting arm 512D and the second shaft supporting arm 514D having a center guiding channel downwardly extended from the coupling end 5112D of the first shaft supporting arm 512D, wherein the center guiding channel of the second shaft supporting arm 514D is communicatively extended from the guiding slot 511D to the mounting hole 201 of the vehicle body 20 in such a manner that the connecting member 41 is substantially supported by the first and second shaft supporting arms 514D when the connecting member 41 is rotatably passing through the center guiding channel of the second shaft supporting arm 514D.

Figure 4:
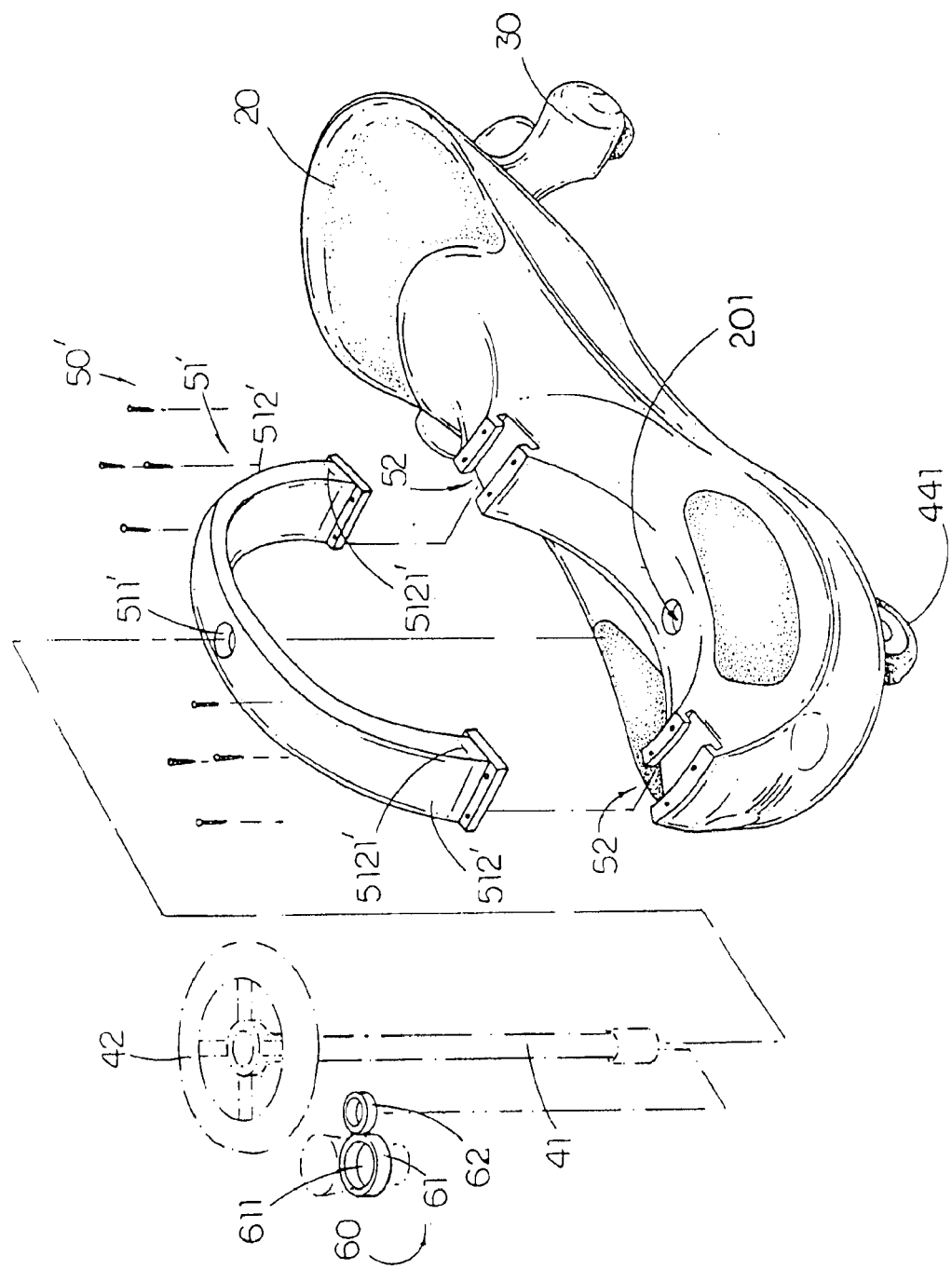
FIG. 4 is a first alternative mode of the steering wheel shaft support frame according to the above first preferred embodiment of the present invention.

Without violating the very spirit of the present invention, the steering wheel shaft support arrangement 50' can have some variations. For example, as a first alternative mode of the above first preferred embodiment of the present invention as shown in FIG. 4, the two supporting arms 512' of the steering wheel shaft support frame 51' are integrally coupled with each other end to end so as to form an one-piece semi-circular steering wheel shaft support frame 51', wherein the connecting member 41 is arranged to pass through the guiding slot 511' provided thereon, as shown in FIG. 4 of the drawings.

Figure 5:
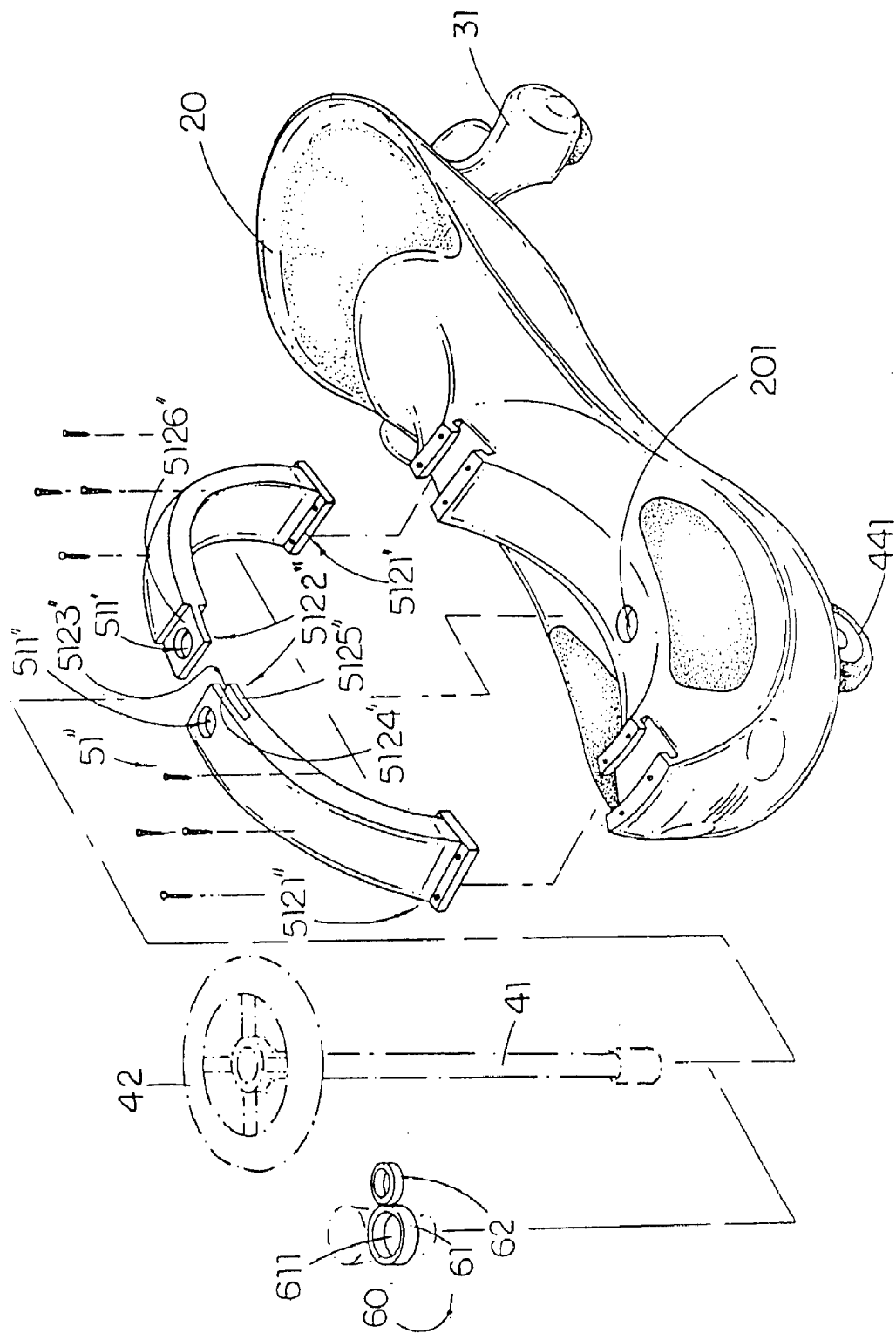
FIG. 5 is a second alternative mode of the steering wheel shaft support frame according to the above first preferred embodiment of the present invention.

Referring to FIG. 5 of the drawings, a second alternative mode of the steering wheel shaft support frame 51" according to the first preferred embodiment of the present invention is illustrated. According to the second alternative mode, the steering wheel shaft support frame 51" comprises first and second supporting arms 512" each having a connecting end 5121" adapted for detachably mounting on the vehicle frame 20", and a coupling end 5122" upwardly extended from the respective connecting end 5121", wherein the coupling ends 5122" of the two shaft supporting arms 512" are arranged to detachably couple with each other.

The coupling end 5122" of the first shaft supporting arm 512" has a U-shaped cross sectional, wherein the first shaft supporting arm 512" has an upper and lower coupling pieces 5124", 5125" extended from the coupling end 5122" thereof to transversely form an engaging slot 5123" therebetween. The second shaft supporting arm 512" has an engaging member 5126" extended from the coupling end 5122" thereof and arranged to slidably insert into the engaging slot 5123" of the first shaft supporting arm 512".

The first and second shaft supporting arms 512" has three holding holes formed on the engaging member 5126", the upper and the second coupling piece 5124", 5125" respectively at the positions that when the engaging member 5126"

of the second shaft supporting arm 512" is inserted into the engaging slot 5123" of the first shaft supporting arm 512", the three through holding holes will coincide with each other to form the through guiding slot 511" for the connecting member 41" to be passes therethrough. In other words, the two coupling ends 5122" of the two shaft supporting arms 512" are coupled together by inserting the engaging member 5126" of the second supporting arm 512" to the engaging slots 5123" of the first shaft supporting arm 512".

In order to enhance the entertainment effect of the twist vehicle 10, the twist vehicle 10 can further comprises a cup holder 60 mounted on the connecting member 41 or the supporting arms 512, wherein the cup holder 60 comprises a holder panel 61 having a resting hole 611 and a mounting ring 62 integrally extended from the holder panel 61 for the connecting member 41 slidably passing through so as to support on the steering wheel shaft support frame 51. Hence, the rider of the twist vehicle 10 can, according to his/her desire, put a cup of drink onto the cup holder 60.

Figure 6:
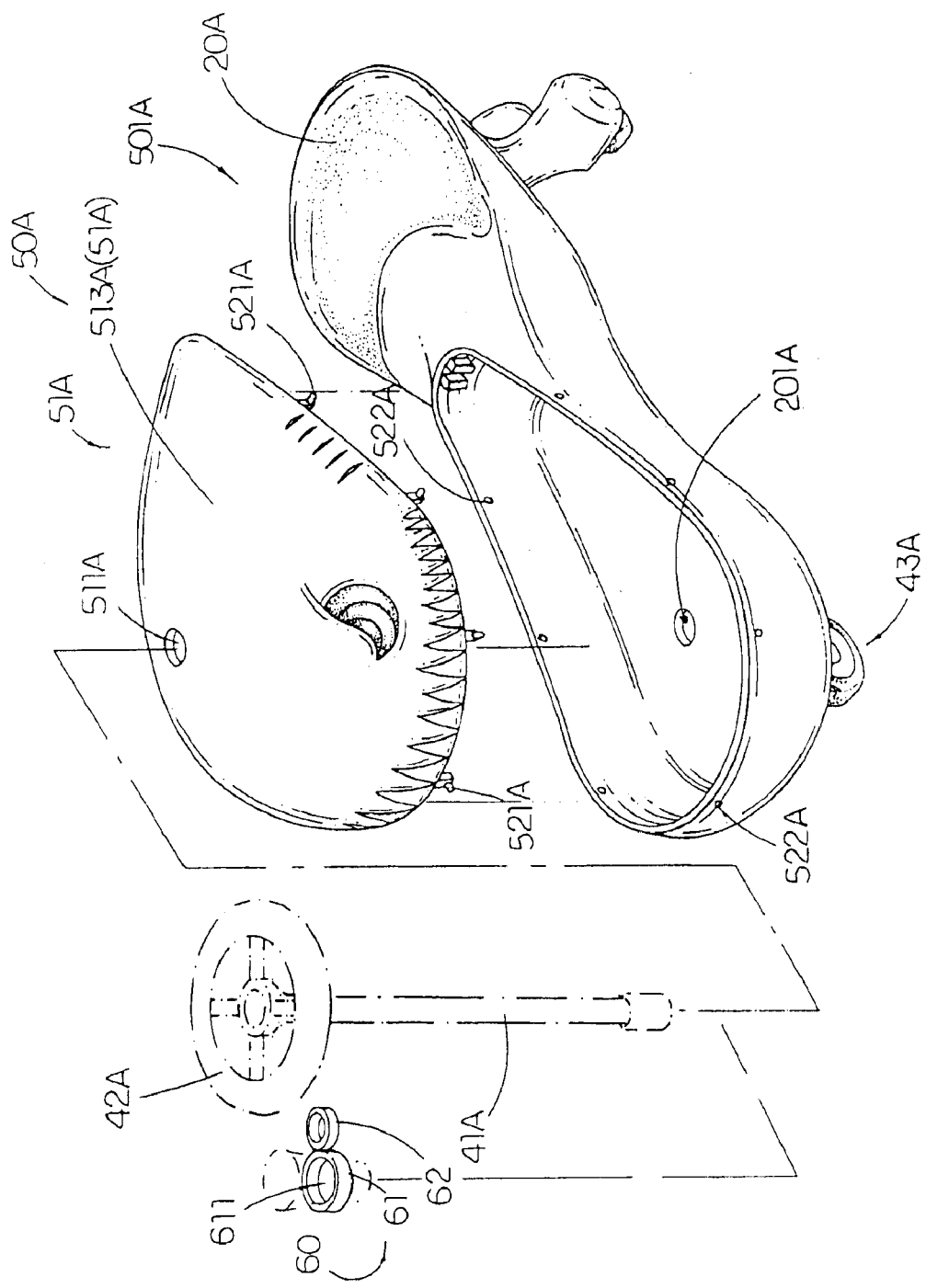
FIG. 6 is a third alternative mode of the steering wheel shaft support arrangement according to the above first preferred embodiment of the present invention.

Referring to FIG. 6 of the drawings, a third alternative mode of the steering wheel shaft support arrangement 50A according to the first preferred embodiment of the present invention is illustrated. According to the third alternative mode, the steering wheel shaft support frame 51A, instead of embodied as two supporting arms, can be embodied as a top cover 513A detachably mounted on the vehicle frame 20A. Of course, the top cover 513A has a guiding slot 511A formed thereon for the connecting member 41A to be passed therethrough so as to connect the twisting unit 40A and the steering member 42A. In addition, the vehicle frame 20A has a mounting hole 201A formed thereon for the connecting member 41A passing through wherein the mounting hole 201A is aligned with the guiding slot 511A in such a manner that two end portions of the connecting member 41A are slidably passed through the guiding slot 511A and the mounting hole 201A to connect the steering member 42A and the twisting member 43A respectively.

As shown FIG. 6 of the drawings, in order to enhance the attractiveness of the twist vehicle 20A, the top cover 513A can be designed and crafted to have a catchy or lovely appearance, such as a shark-like top cover 513A.

It is worth mentioning that the top cover 513A can be detachably covered on a front portion of the vehicle frame 20A by means of some conventional methods such as screwing. Or alternatively, the mounting means 501 has a plurality of mounting slots 521A provided peripherally along an edge of the vehicle frame 20A and comprises a plurality of elastic mounting clasps 522A provided peripherally along a corresponding edge of the top cover 513A, wherein the elastic mounting clasps 521A are adapted to detachably engage with the mounting slots 522A of the vehicle frame 20A respectively so as to detachably mount the top cover 513A onto the vehicle frame 20A.

With reference to the above third alternative mode of the present invention, the twist vehicle 10A comprises the top cover 513A (51A) as a top frame and the vehicle frame 20A as a base frame peripherally mounted together, wherein the steering wheel shaft support frame51A which is the top cover 513A is detachably mounted on the vehicle frame 20A.

Moreover, the twist vehicle 10A further comprises a cup holder 60 mounted on the connecting member 41A, wherein the cup holder 60 comprises a holder panel 61 having a resting hole 611 and a mounting ring 62 integrally extended from the holder panel 61 for the connecting member 41A slidably passing through.

Figure 7:
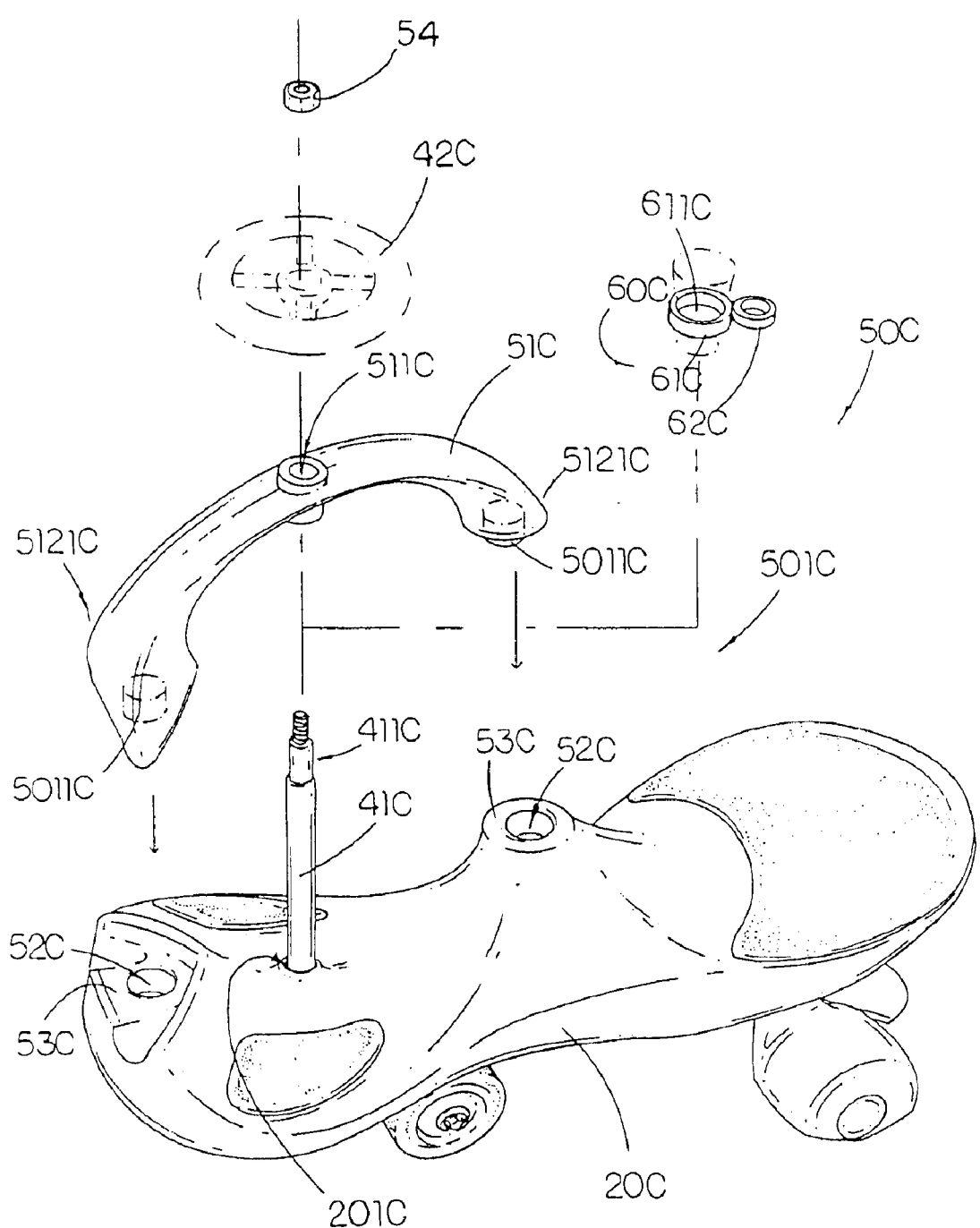
FIG. 7 is an exploded perspective view of a twist vehicle with a wheel shaft support arrangement according to a second preferred embodiment of the present invention.
Figure 8:
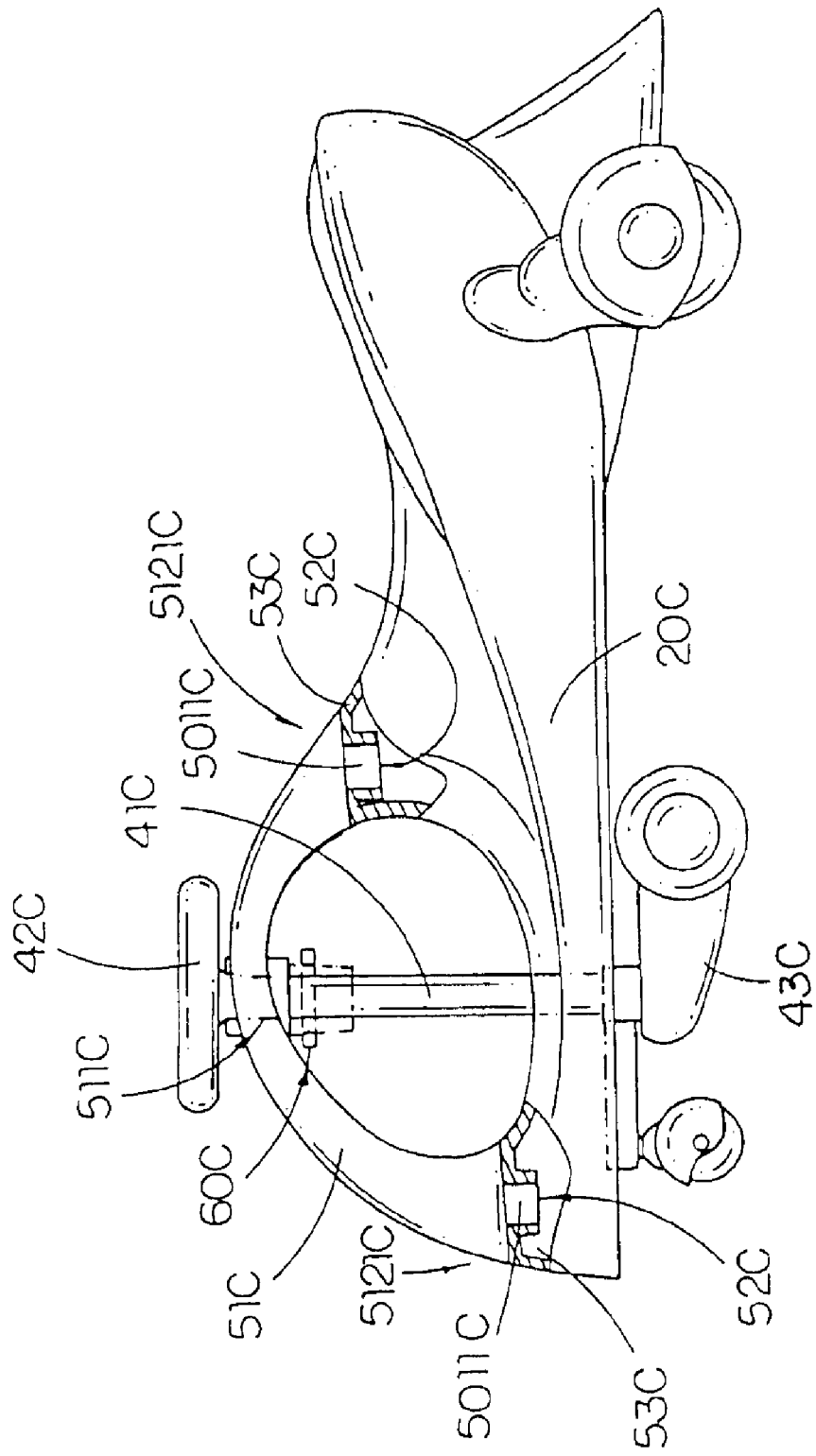
FIG. 8 is a sectional view of the twist vehicle with the wheel shaft support arrangement according to the above second preferred embodiment of the present invention.

As shown in FIGS. 7 and 8, a twist vehicle 20C of a second embodiment illustrates an alternative mode of the first embodiment of the present invention, wherein the steering wheel shaft support arrangement 50C comprises an arc-shaped steering wheel shaft support frame 51C and means 501C for detachably mounting the steering wheel shaft support frame 51C on the vehicle frame 20C.

The steering wheel shaft support frame 51C has a guiding slot 511C formed thereon for the upper control portion 411C of the connecting member 41C slidably passing through and two connecting ends 5121C adapted to detachably mounted on the vehicle frame 20C, wherein the connecting member 41C is slidably passed through a mounting hole 201C of the vehicle frame 20C in a rotatably movable manner to connect the twisting member 43C. Therefore, the steering member 42C is supported on top of the wheel shaft support frame 51C.

The mounting means 501C comprises two connecting posts 5011C downwardly extended from the connecting ends 5121C of the steering wheel shaft support frame 51C respectively and contains two securing slots 52C vertically formed on the vehicle frame for the connecting posts 5011C slidably inserting thereinto, so as to detachably mount the steering wheel shaft support frame 51C on the vehicle frame 20C in position.

The mounting means 501C further comprises a plurality of connectors 54 such as screws or bolts to securely mount the steering wheel shaft support frame 51C on the vehicle frame 20A. Therefore, the rider is able to detach the steering wheel shaft support frame 51C from the vehicle frame 20C by simply unscrewing the connectors and then disengaging the connecting posts 5011C from the securing slots 52C respectively.

In addition, the mounting means 501C further comprises two supporting seats 53C integrally provided on the vehicle frame 20C around the securing slots 52C respectively in such a manner that when the two connecting posts 5011C are inserted into the two securing slots 52C respectively, the two connecting ends 5121C of the steering wheel shaft support frame 51C are substantially supported on the supporting seats 53C respectively so as to further retain the steering wheel shaft support frame 51C on the vehicle frame 20C in position. As shown in FIG. 7, at least one of the supporting seats 53C is shaped to have a non-circular shape such that when the respective connecting end 5121C of the steering wheel shaft supporting frame 51C is sat on the supporting seat 53C, a peripheral wall of the supporting seat 53C is encirclingly engaged with a peripheral wall of the respective connecting end 5121C of the steering wheel shaft supporting frame 51C so as to substantially hold the steering wheel shaft supporting frame 51C in position. Accordingly, the respective connecting end 5121C of the steering wheel shaft supporting frame 51C has a triangular shape to sit on the triangular shaped supporting seat 53C.

Moreover, the twist vehicle 10C further comprises a cup holder 60C mounted on the connecting member 41C, wherein the cup holder 60C comprises a holder panel 61C having a resting hole 611C and a mounting ring 62C integrally extended from the holder panel 61C for the connecting member 41C slidably passing through It is worth mentioning that the steering wheel shaft support frame 51C, according to the second embodiment, can be constructed to have two shaft supporting arms 512 as illustrated in the first embodiment wherein each of the shaft supporting arms 512 has a coupling end 5112 to detachably couple with the coupling end 5112 of another shaft supporting arm 512 so as to form the guiding slot 511.

In view of the above disclosure of the present invention, the wheel shaft support arrangement 50 provides a rigid support for the twisting unit 40 so as to prevent an unwanted lateral movement of the connecting member 41 when the subsequent clockwise and anti-clockwise movements are imparted to the steering member 42. Moreover, the twist vehicle of the present invention can be decomposed into several parts for easy storage and transportation.

What is claimed is:

1. A twist vehicle comprising:
    a vehicle frame having a mounting hole formed thereon to communicate an upper side of said vehicle frame to a bottom side thereof;
    a rear wheel assembly rotatably mounted underneath a rear portion of said vehicle frame;
    a twisting unit, which comprises:
    a connecting member rotatably supported by said vehicle frame, wherein said connecting member has an upper control portion extended above said vehicle frame, and a lower driving portion extended underneath said upper driving portion through said mounting hole and arranged in such a manner that when a rotational motion is imparted to said upper control portion, said lower driving portion rotates accordingly;
    a steering member detachably mounted on said upper control portion of said connecting member;
    a twisting member having a front portion mounted on said lower driving portion of said connecting member; and
    a driving wheel assembly mounted on a rear portion of said twisting member, wherein when subsequent clockwise and anti-clockwise movements are imparted to said steering member, said twisting member rotates accordingly about said connecting member so as to drive said twist vehicle to move; and
    a wheel shaft support arrangement which comprises:
    a steering wheel shaft supporting frame, having an arc shape, having two connecting ends and a guiding slot formed between said two connecting ends; and
    a mounting means containing two securing slots spacedly and vertically provided on said vehicle frame such that said mounting hole is positioned between said securing slots, and comprising a connector detachably locked at said upper control portion of said connecting member, wherein said two connecting ends of said steering wheel shaft supporting frame are slidably inserted into said securing slots respectively to detachably mount said steering wheel shaft support frame on said vehicle frame at a position such that said guiding slot is coaxially align with said mounting hole of said vehicle frame such that when said connector is attached to said upper control portion of said connecting member at a position above said steering wheel shaft supporting frame, said upper control portion of said connecting member is rotatably supported by said steering wheel shaft supporting frame through said guiding slot so as to substantially lock up said connecting member with said vehicle frame in a rotatably movable manner.

2. The twist vehicle, as recited in claim 1, wherein said mounting means further comprises two connecting posts downwardly extended from said two connecting ends of said steering wheel shaft support frame and arranged to slidably insert into said two securing slots respectively, so as to detachably mount said steering wheel shaft support frame on said vehicle frame in position.

3. The twist vehicle, as recited in claim 2, wherein said mounting means further comprises two supporting seats, which are shaped and sized corresponding to said two connecting ends of said steering wheel shaft supporting frame respectively, integrally provided on said vehicle frame around said securing slots respectively in such a manner that when said two connecting posts are inserted into said two securing slots respectively, said two connecting ends of said steering wheel shaft supporting frame are substantially supported on said supporting seats respectively so as to further retain said steering wheel shaft support frame on said vehicle frame in position.

4. The twist vehicle, as recited in claim 3, wherein at least one of said supporting seats is shaped to have a non-circular shape such that when said respective connecting end of said steering wheel shaft supporting frame is sat on said supporting seat, a peripheral wall of said supporting seat is encirclingly engaged with a peripheral wall of said respective connecting end of said steering wheel shaft supporting frame so as to substantially hold said steering wheel shaft supporting frame in position.

5. The twist vehicle, as recited in claim 1, further comprising a cup holder detachably mounted on said connecting member, wherein said cup holder comprises a holder panel having a resting hole and mounting ring integrally extended from said holder panel for said connecting member slidably passing through, so as to mount said cup holder adjacent to said connecting member.

6. The twist vehicle, as recited in claim 2, further comprising a cup holder detachably mounted on said connecting member, wherein said cup holder comprises a holder panel having a resting hole and mounting ring integrally extended from said holder panel for said connecting member slidably passing through, so as to mount said cup holder adjacent to said connecting member.

7. The twist vehicle, as recited in claim 3, further comprising a cup holder detachably mounted on said connecting member, wherein said cup holder comprises a holder panel having a resting hole and mounting ring integrally extended from said holder panel for said connecting member slidably passing through, so as to mount said cup holder adjacent to said connecting member.

8. The twist vehicle, as recited in claim 4, further comprising a cup holder detachably mounted on said connecting member, wherein said cup holder comprises a holder panel having a resting hole and mounting ring integrally extended from said holder panel for said connecting member slidably passing through, so as to mount said cup holder adjacent to said connecting member.

* * * * *